Jan. 4, 1927.
C. OWENS
1,613,123
GAS GENERATOR
Original Filed Dec. 22, 1919  2 Sheets-Sheet 1
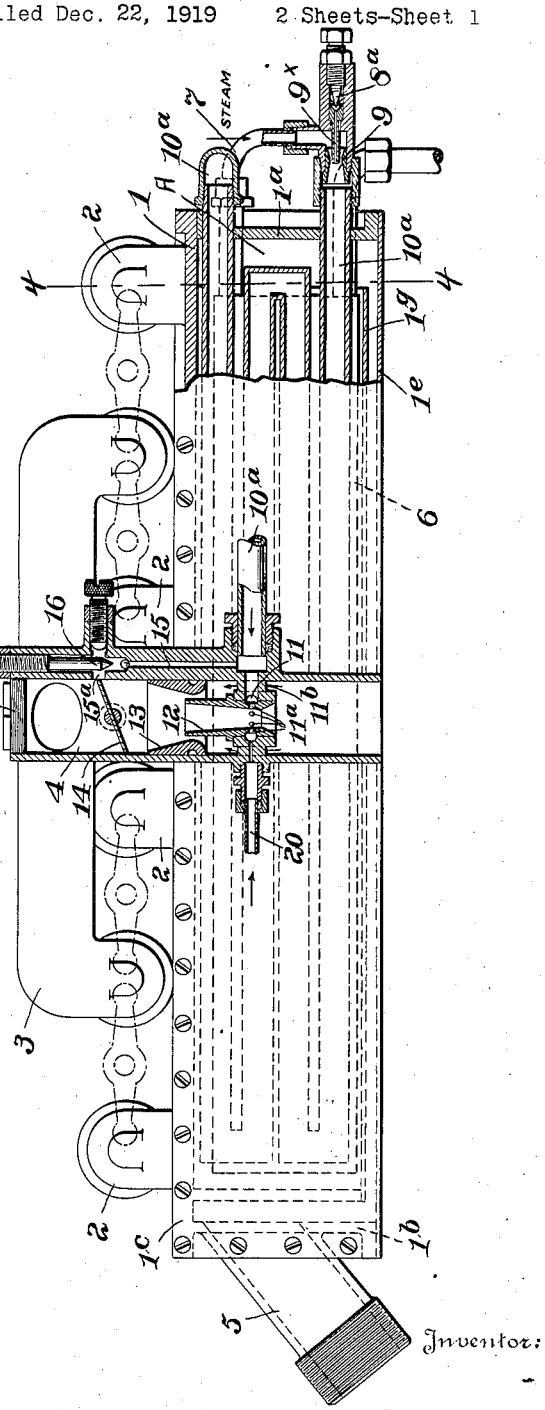
Inventor:
Charles Owens,
By Spear, Middleton, Donaldson & Spear
Attorneys.

Jan. 4, 1927.
C. OWENS
1,613,123
GAS GENERATOR
Original Filed Dec. 22, 1919    2 Sheets-Sheet 2
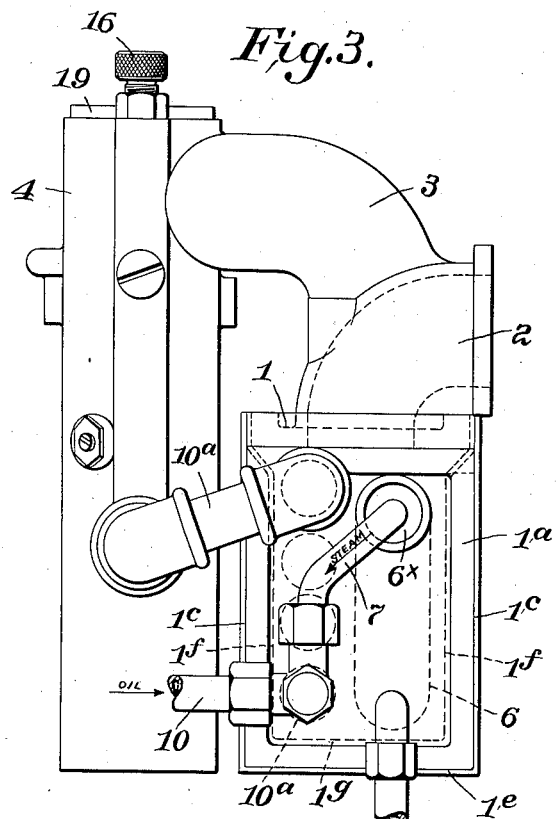
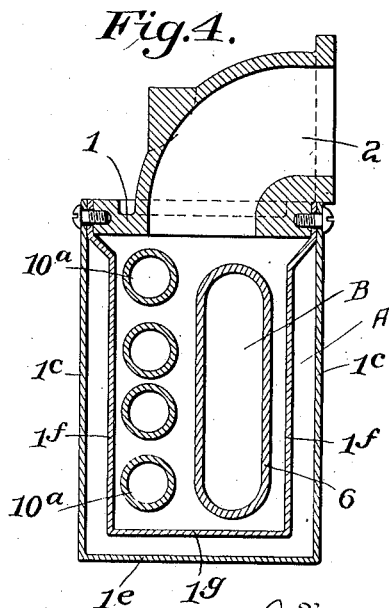
Inventor:
Charles Owens, Patented Jan. 4, 1927.

1,613,123

UNITED STATES PATENT OFFICE.

CHARLES OWENS, OF CHATTANOOGA, TENNESSEE.

GAS GENERATOR.

Application filed December 22, 1919, Serial No. 346,721. Renewed April 1, 1926.

My present invention relates to apparatus designed to be applied to or used in connection with an internal combustion engine, more particularly such as used in motor vehicles and motor boats, whereby a combustible fuel mixture may be produced from oil and water.

The invention aims to provide a simple, economical and efficient arrangement adapted to be bolted directly to the engine in place of the ordinary exhaust and intake manifolds whereby the hot exhaust products of the engine will be utilized to generate steam which is commingled with the oil and the mixture also heated by said exhaust products to produce an efficient oil and water gas for running the engine.

The invention further aims to provide an improved carburetting or mixing arrangement for commingling the gas thus formed with the air necessary to produce the proper mixture for combustion, and a still further object is to provide in connection therewith means by which gasoline may be used for starting and running the engine until the requisite amount of heat has been developed to enable the gas producer to function properly.

The apparatus also has an interchangeable capacity involving feeding to the carburetting venturi either the combustible mixture resulting from the union of the oil and water in the presence of the heat of the exhaust, or feeding gasoline and steam to the Venturi carburetter device or mixer.

With these and other objects in view, the invention includes the novel features of construction and arrangement and combination of parts hereinafter described, my said invention being defined by the claims appended to the following description.

In order that my invention may be more readily understood, I have appended hereto drawings illustrative of an embodiment thereof, in which:

Fig. 1 is a top plan view;

Fig. 2 is a front elevation with parts broken away;

Fig. 3 is a view of the right-hand end of Fig. 1, and

Fig. 4 is a detail view of a section substantially on line 4—4 of Fig. 2, through one of the manifold members and the heating chamber.

Referring by reference characters to this drawing, the numeral 1 designates a plate or casting which is provided with exhaust manifold members 2 designed to align with the exhaust ports of an engine (not shown) and with an inlet manifold 3 which communicates with a vertical intake pipe 4.

A heating chamber carried by the plate or member 1 which comprises end walls $1^a$ and $1^b$, side plates $1^c$, and a bottom plate $1^e$. The end wall $1^b$ is provided with an exhaust outlet 5 which may be connected to an ordinary muffler, though by reason of the construction and arrangement of my improved heater, the necessity for a muffler is largely eliminated.

Within the space formed by said heater walls is an inner casing or baffle chamber comprising partition walls $1^f$ depending from the plate 1 to a suitable distance above the bottom $1^e$, and a longitudinally extending bottom wall $1^g$, which three walls form an inner chamber open to the main heating chamber A, Figs. 2 and 4, at the right-hand end, Fig. 2, so that all the heated products of combustion are compelled to travel to the right-hand end of the heating chamber and thence back between the inner baffle heating chamber B and the side and bottom walls of the heating chamber A, Figs. 2 and 4 to the exhaust outlet 5.

Within the inner baffle chamber B, I place a boiler 6 having an open or free end $6^x$. This boiler is designed to be supplied with water in any suitable manner so as to maintain water therein at a determined water level. A convenient source of water supply would be the water cooling system of the engine, and the height of the water would be determined and maintained by any suitable means such as a float valve, which, being well known in the art, is not illustrated herein.

From the boiler a steam pipe 7 leads to a Venturi passage 9. Oil is supplied to the Venturi tube by a nozzle $9^x$ controlled by a valve 8ª from pipe 10 and is drawn into the apparatus in an atomized condition by the Venturi action of the steam through the suction action of the piston, the amount of oil delivered being controlled by the suction of the engine after the needle valve 8ª is set or adjusted.

Contributing to this action just stated is the fact that the boiler 6 is open to the atmosphere at 6ˣ so that the steam which is drawn in from the boiler 6 to the venturi through the pipe 7 will be at atmospheric pressure and the amount drawn in will therefore vary according to the demands of the engine, and the relative proportion of steam to the oil is maintained under all working conditions.

The oil may be fed by gravity from any suitable source, float controlled or otherwise. From the Venturi tube the mingled oil and steam is conveyed by a generator pipe 10ª through the inner baffle chamber B in a zigzag manner whereby it is subjected to the heat of the products of combustion and is converted into a combustible mixture. The generator pipe 10ª communicates with an annular chamber 11 from which the gas passes through an annular series of ports 11ª to the Venturi tube 12 where it mingles with the air passing therethrough under the suction action of the engine.

The part which contains the annular chamber 11 and supports the Venturi tube 12 is of spider formation or provided with passages 11ᵇ, through which air passes to the annular space around the upper portion of the Venturi tube 12, above which space is a second venturi 13 which effects a commingling of the air passing through the passages 11ᵇ and the rich gaseous mixture which issues from the venturi 12.

The usual butterfly throttle valve is shown at 14 and to supply the engine with combustible mixture when throttled down, I provide a by pass 15 which communicates with the intake pipe by a port 15ª. This is so arranged that when the throttle is closed, as shown in Fig. 2, a small proportion of the fuel mixture is permitted to pass around the edge of the valve and in so doing is mixed with an additional supply of gas coming from the by-pass 15 to afford a richer mixture for starting and idling the motor.

The amount of gas passing through the by-pass can be regulated by a needle valve 16.

The top of the intake pipe is provided with a removable screw plug 19.

For starting the motor when cold I provide a gasoline pipe 20 connected with any suitable source of gasoline supply by which gasoline may be fed to the annular chamber 11 to start and run the engine until sufficient heat has been generated to start the production of oil and water gas. From the above, it will be seen that the steam is not introduced to the oil expansively or under pressure but is supplied, rather at atmospheric pressure or as a water vapor without force back of it, this being due to the opening at 6ˣ leading to the atmosphere from the boiler and from which open port the steam is taken by the supply pipe leading to the oil duct.

Furthermore, it will be seen that the commingled oil and steam passes through a generator on its way to the carburetter and is subjected to the heat of the exhaust from the engine, and this heat is effectively applied by the use of the heating chamber having the baffle chamber within it, open at only one end, that is, the end opposite the final discharge, said chamber receiving the combustion products and causing them to be directed against the generator and thereafter to pass along the outside of the baffle chamber through the space between it and the outer walls of the heating chamber.

Having thus described my invention, what I claim is:

1. In combination, a chamber having ports adapted for connection with the exhaust ports of an internal combustion engine and constituting an exhaust manifold, an air pipe having branches for connection with the engine intake ports and constituting an intake manifold, a gas generator pipe leading through said chamber and discharging into said air pipe, a steam boiler in said chamber, and means for delivering steam from said boiler to said generator pipe, and an oil supply leading to said generator.

2. In combination, a chamber having ports adapted for connection with the exhaust ports of an internal combustion engine, said chamber constituting an exhaust manifold, an air pipe having branches for connection with the engine intake ports and constituting an intake manifold, a gas generator within the chamber extending longitudinally thereof, a shield or baffle chamber surrounding the generator, closed at one end and open at the other end and forming a space between itself and the chamber wall for insulating the chamber by the heat of the discharging gases, said baffle chamber receiving the exhaust gases within it from the exhaust manifold and at different points, and a discharge outlet for the exhaust gases from the chamber adjacent the closed end of the baffle chamber, substantially as described.

3. In combination with the ports of an exhaust manifold of an internal combustion engine, a chamber receiving exhaust products from said ports, said heated chamber having a baffle heated chamber, the walls of which are spaced apart from the heated chamber wall for the passage of the exhaust products after leaving said baffle chamber, a discharge outlet leading from the heated chamber at one end, said baffle chamber being closed at the end adjacent the discharge outlet and being open at its opposite end, and a gas generator within the said baffle chamber, said baffle directing the heat products along said generator and serving to provide a heated space between itself and the wall of the heated chamber to insulate said baffle chamber with the enclosed generator.

4. A gas supply system for internal combustion engines, comprising means for delivering oil, means for delivering steam to the oil at its delivery point, a pipe connected with an engine intake at one end and open to the atmosphere, means by which the oil and steam are commingled under heat from the exhaust products from an engine, said means delivering the gas resulting from the heated mixture of oil and steam to the said pipe to be drawn into an engine by suction, and a steam generator independent of said commingling means and heated by the exhaust products of an engine for supplying the steam delivered to the oil, substantially as described.

5. A gas generating attachment for internal combustion engines for generating gas from oil and water by means of the heat of the exhaust, comprising means for supplying oil, means for supplying steam, a Venturi controlled atomizing nozzle for atomizing oil by steam through the suction action of an engine, means for securing the gas generator directly to an engine to be heated by the exhaust therefrom, said gas generator being subjected to the suction from an engine, and means for supplying gasoline to the intake manifold, independent of the gas generator until the generator is heated to a gas generating temperature.

6. A gas generating attachment for internal combustion engines, comprising a chamber adapted to receive and be heated by the exhaust products therefrom, an air pipe connected with an engine intake, a gas generating pipe leading through said heated chamber heated by the same and delivering into said air pipe, a Venturi controlled atomizing nozzle for atomizing regulable amounts of oil by steam into the said gas generator pipe through the suction action of an engine, and a steam generator in said chamber connected with said oil pipe to deliver steam thereto at atmospheric pressure.

7. A gas generating attachment for internal combustion engines comprising a heated chamber to receive the exhaust products therefrom, an air pipe adapted for connection with an engine intake and having a Venturi mixing nozzle, a gas generator pipe leading through said heated chamber and delivering into said venturi, and suction means for atomizing oil by steam into said gas generator pipe through the action of the venturi, substantially as described.

8. An attachment for internal combustion engines, comprising a chamber to receive the exhaust products therefrom, an air pipe adapted for connection with an engine intake and having a mixing nozzle, a gas generator pipe leading through said chamber and delivering into said mixing nozzle, and means for automatically atomizing a varying amount of oil and steam at previously determined proportions and supplying the atomized mixture of oil and steam to said gas generator pipe by the suction of an engine.

9. A gas supply system for internal combustion engines, comprising a series of mixing nozzles, having gas generating means interposed between, means for heating the gas generating means to a gas generating temperature by the heat from the exhaust of an engine, means for supplying steam to the initial nozzle of the series at atmospheric pressure, means for supplying oil to said nozzle at atmospheric pressure. Venturi means under the control of the suction of an engine whereby the steam is made to feed the oil in an atomized state, in regulable amounts, to the gas generating means while being subjected to the expanding action of the suction of an engine to be converted into a gas by the exhaust heat before it reaches the other nozzle of the series, means for supplying air to the second nozzle of the series, and Venturi means under the control of the suction of an engine whereby the air is mixed with the gas or combustible mixture before it is delivered to an engine.

10. In a gas generator for generating gas from oil and water by means of the heat from the exhaust of an internal combustion engine, a series of mixing nozzles having a heating chamber interposed, said mixing nozzles being under the control of the suction of an engine, means for supplying steam and oil at atmospheric pressure, in regulable amounts, to the primary nozzle of the series to be commingled and atomized in their passage through the nozzle enroute to the interposed heating chamber while being subjected to the expanding action of the suction of an engine, means for supplying air to the other nozzle of the series and means whereby the hot gas from the heated chamber are commingled with the air before delivery to an engine.

11. A suction controlled gas generating system, comprising means for subjecting oil to the expanding action of the suction of an engine, Venturi means for automatically mixing oil and steam at previously determined regulable amounts by said suction means, means for supplying oil to said venturi, means for supplying the steam alone thereto at substantially atmospheric pressure, and means for subjecting the mixture to heat for gasifying before the admixture of air.

12. In combination, means for automatically supplying oil to a gas generating coil with steam at atmospheric pressure, in an atomized condition, through the suction action of an engine, means for heating the commingled steam and oil to a gas generating temperature to generate a gas before the admixture of air, and means connected with the atmosphere and with the gas generating coil and into which the coil delivers its products, for mixing the gas with air for delivery to an engine.

In testimony whereof I affix my signature.

CHARLES OWENS.